US009652740B2

(12) United States Patent
Janarthanam et al.

(10) Patent No.: US 9,652,740 B2
(45) Date of Patent: May 16, 2017

(54) FAN IDENTITY DATA INTEGRATION AND UNIFICATION

(71) Applicants: Baskaran Janarthanam, Cupertino, CA (US); Divyesh Jain, Sunnyvale, CA (US); Rajesh Prabhu, San Jose, CA (US)

(72) Inventors: Baskaran Janarthanam, Cupertino, CA (US); Divyesh Jain, Sunnyvale, CA (US); Rajesh Prabhu, San Jose, CA (US)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 14/585,191

(22) Filed: Dec. 30, 2014

(65) Prior Publication Data

US 2016/0188685 A1 Jun. 30, 2016

(51) Int. Cl.
*G06F 17/00* (2006.01)
*G06Q 10/10* (2012.01)
*G06F 17/30* (2006.01)

(52) U.S. Cl.
CPC ....... *G06Q 10/10* (2013.01); *G06F 17/30368* (2013.01); *G06F 17/30563* (2013.01); *G06F 17/30867* (2013.01)

(58) Field of Classification Search
CPC .............. G06Q 10/10; G06F 17/30867; G06F 17/30563; G06F 17/30368
USPC ........................................................ 707/602
See application file for complete search history.

(56) References Cited

U.S. PATENT DOCUMENTS

| 7,533,124 | B2* | 5/2009 | Hellman | G06F 17/30557 |
| 8,892,446 | B2* | 11/2014 | Cheyer | G06F 17/3087 |
| | | | | 704/246 |
| 8,942,986 | B2* | 1/2015 | Cheyer | G06F 17/3087 |
| | | | | 704/231 |
| 9,117,447 | B2* | 8/2015 | Gruber | G06F 17/3087 |
| 9,342,625 | B2* | 5/2016 | Doganata | G06Q 10/00 |
| 2004/0230572 | A1* | 11/2004 | Omoigui | G06F 17/30528 |
| 2006/0156253 | A1* | 7/2006 | Schreiber | G06F 17/30557 |
| | | | | 715/835 |

(Continued)

OTHER PUBLICATIONS

Evermann, Joerg, et al., "Ontology based object-oriented domain modelling: fundamental concepts", Requirements Engineering, vol. 10, Issue 2, May 2005, pp. 146-160.*

(Continued)

*Primary Examiner* — Robert Stevens

(57) ABSTRACT

An analytical request for information that includes queryable attributes mapped to corresponding fields of customer records from in-memory database of a number of data sources is received. Semantic mapping of the queryable attributes to the corresponding fields of the customer records is resolved according to semantic mapping metadata. A query that includes the corresponding fields is generated and over the in-memory database views and a number fan records each representing a unique fan entity. Fan related data is retrieved from the number of fan records and the in-memory database views based on the executed at least one query. Upon executing the query, at runtime the in-memory database views are dynamically integrated with the number fan records based on a cross-reference table linking the in-memory database views with the number of fan records based on a fan identifier.

20 Claims, 5 Drawing Sheets

(56) References Cited

U.S. PATENT DOCUMENTS

2006/0167946 A1* 7/2006 Hellman ............ G06F 17/30557

OTHER PUBLICATIONS

Al-Fedaghi, Sabah, "Toward Flow-Based Semantics of Activities", International Journal of Software Engineering and Its Applications, vol. 7, No. 2, Mar. 2013, pp. 171-182.*

* cited by examiner

FAN IDENTITY DATA INTEGRATION AND UNIFICATION

BACKGROUND

Traditionally, an Extract, Transform, Load (ETL) process is employed to integrate data from heterogeneous data sources. For example, ETL process is used to integrate data from different applications or systems, developed and supported by different vendors or hosted on separate computer hardware. Usually, the data from the different data sources is studied and analyzed by experts that define transformations for storing the data in proper format or structure for querying and analysis purpose. Data is extracted or pulled from the heterogeneous data sources. While data is being pulled, the transformations may execute, processing the already received data and preparing the data for loading. As soon as there is some data ready to be loaded into the target system, the data loading may start without waiting for the completion of the previous phases. The ETL, process requires data to he transformed for it to be transferred to a target system via the loading process, where, for example, the data is used for reporting and analytics purposes. However, if the transformations need to be modified, the transformed data from the target system need to be cleaned, the new transformation logic need to be incorporated, and the ETL process need to be executed once again. Thus, newly transformed data need to be reloaded into the target system. Such process may demand more computing resources and may be time consuming with higher volumes of data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques smart retail space are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Integrating unrelated data from disconnected systems that has varied representation (e.g., different schemas and keys) may be complex, expensive and error prone. For example, unifying data and providing uniform view of the data derived from unrelated systems such as cloud services, social networks, custom systems, etc., may be time consuming and expensive to solve. When unifying customer data from heterogeneous data sources, users' or customers' identities need to be resolved, otherwise the data may be ambiguous. For example, a customer may use one name in one system arid a nickname in another system, but still be the same customer. Unifying and distinguishing identity may be challenging because, for example, when the systems are unrelated a foreign key match may not he executed to the determine customer record containing personal information. In one embodiment, based on fan identity unification metadata, customer data from heterogeneous data sources is unified into fan golden records that represent fan identities. Based on fan golden records, dynamic integration of customer data from the heterogeneous data sources is implemented, according to one embodiment.

Figure 1:
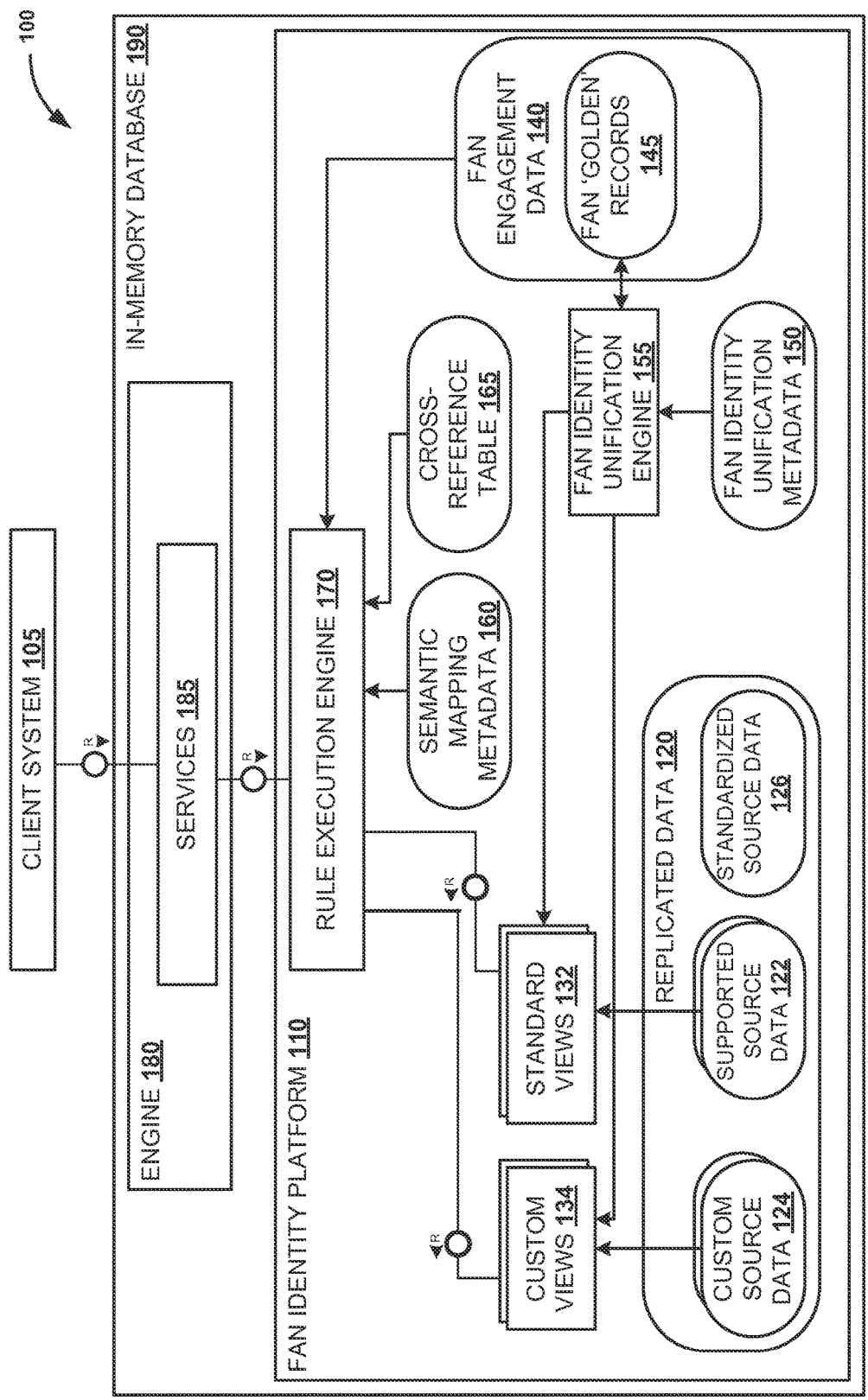
FIG. 1 illustrates computer architecture to dynamically integrate and unify customer data to generate fan golden records, according to one embodiment.

FIG. 1 illustrates computer architecture 100 to dynamically integrate and unify customer data to generate fan golden records, according to one embodiment. Data from heterogeneous data source systems is replicated as-is, e.g., without transforming the data prior its loading to fan identity platform 110 from the source systems, whereas traditional ETL process first transforms the source data prior its transportation to the target system. In one embodiment, replicated data 120 may be transformed once it is loaded to fan identity platform 110. For example, replicated data 120 may be transformed by modeling replicated data 120 in database views such as standard views 132 and custom views 134. The database views define the transformation of replicated data 120. The database views are unified representations of customer data that has different representations, where the customer data may also be spread across multiple disparate systems. Replicated data 120 may include supported source data 122 that may be pushed or pulled from data source systems such as Ticketmaster® Entertainment. Inc., Facebook®, Customer Relationship Management (CRM), etc. Similarly, replicated data 120 may include other standardized source data 126 or custom source data 124.

In one embodiment, standard views 132 may be provided by the provider of fan identity platform 110 for supported source data 122. Custom views 134 may be defined and provided by providers of custom source data 124. Standard views 132 and custom views 134 may be pre-prepared template database views such as SAP HANA® views. Fan identity platform 110 uses standard views 132 and custom views 134 to represent external data sources uniformly.

Exemplary standard views 132 and custom views 134 include, but are not limited to, attribute views, analytic views, and calculation views. An attribute view is an information view that may be used to define joins between tables and select a subset (or all) of their columns. The selected rows may be restricted by filters. Another application of attribute views may be in the role of a dimension in a star schema defined by an analytic view. In this case the attribute view adds More columns and also hierarchies as further analysis criteria to the analytic view. In the star schema of the analytic view the attribute view may be shown as a single dimension table that can be joined to a fact table. For example attribute views may be used to join employees to organizational units and then the result can be joined to a sales fact table in the analytic view.

Analytic view is a set of physical tables interconnected in a star schema Of fact tables surrounded by dimensions, calculations or restricted measures. Analytic views are typically defined on at least one fact table that contains transactional data. Using analytic views you can create a selection of measures—sometimes referred to as key figures add attributes and join attribute views. In one embodiment, analytic views leverage the computing power of an in-memory database to calculate aggregate data, e.g., the number of cars sold per country, or the maximum power consumed per day. Analytic views may contain two types of attributes or columns: measures and key figures. Measures are attributes for which an aggregation may need to be defined.

Calculation views are composite views used on top of analytical and attribute views. Calculation views may combine different fact tables. Calculation views may be defined as either graphical views or scripted views depending on how they are created. In one embodiment, graphical views can be modeled using the graphical modeling features of the SAP HANA Modeler. Scripted views are created as sequences of SQL statements. Exemplary HANA views may contain, for example, CRM Business Master Data, CRM transactional data (e.g., activities, leads, opportunities, sales, and service data, etc.), ERP SD transactional data (e.g., revenue, pocket margin, etc.), external customer satisfaction data, and other information.

In one embodiment, a fan golden profile table may be created. Such a fan golden profile table may include fan golden records 145. Fan golden records 145 represents key information used to identify and categorize fans. A fan golden record may hold values for attributes including, but not limited to, first name, last name, nickname, gender, age, marital status, email address, home address, telephone information, etc.

In one embodiment, fan identity unification metadata 150 may be created. Fan identity unification metadata 150 represents the logic according to which customer of fan data from disparate data sources are unified to fan golden records. Fan identity unification metadata 150 includes attributes mapping metadata. In the attributes mapping metadata attributes of customer records from the number of data sources (e.g., standard views 132 and custom views 134) are mapped to attributes of fan golden records 145. For example, if fan golden records 145 include six attributes: first name, last name, email phone, address, and gender, each of the six attributes are mapped to a corresponding field from the number of data sources. Attributes mapping specifies a field in a data source that corresponds to an attribute in fan golden records 145. For example, 'data source 1', 'field 1' corresponds to attribute 'X' of the fan golden records; 'data source 2', 'field 1' corresponds to attribute 'X' of the fan golden records, etc.

Fan identity unification metadata 150 further includes unification rules that represent the logic to be applied when unifying customer entities that are matching a fan entity represented by a fan golden record from fan golden records 145. An exemplary unification rule may be that if a first name, a last name, and an email address of two entities match then the two entities are matching entities and may, in fact represent the same fan entity despite being derived from disparate data source systems. Various types of unification rules that may be defined are discussed with reference to FIG. 2.

Fan identity unification metadata 150 further includes precedence metadata. The precedence metadata may specify the level of accuracy of a data source compared to other data sources. Further, precedence metadata may specify level of accuracy of an attribute of a customer record from one data source relative to a corresponding attribute of a customer record from another data source. For example, names attribute values that are derived from one data source such as Ticketmaster® Entertainment, Inc. may be specified as more accurate than names attribute values that are of another data source such as Facebook. For each fan golden record attribute, a priority or precedence may be specified. Thus, even if data is loaded into fan golden records from a data source with a lower precision first, at runtime during the unification process, the data may be overridden by attributes' values from a data source designated to be with higher priority or precedence. Since, source data is maintained in-memory, e.g., into in-memory database 190, fan golden records 145 may evolve and refine during runtime based on precedence metadata.

Fan identity unification engine 155 is a runtime process that generates fan golden records 145 based fan identity unification metadata 150. Fan identity unification engine 155 reads attributes values of customer records from data sources such as standard views 132 and custom views 134 and applies logic specified in fan identity unification metadata 150 to load attribute values from the data source to fan golden records 145.

To integrate source data from the number of data sources a cross-reference table 165 may be generated. Cross-reference table 165 is a linking table that joins customer records from the number of data source and fan golden records 145. The cross reference table 165 is created based on fan identifiers from fan golden records 145 and customer identifiers from the number of data sources such as custom source data 124 and supported source data 122. Thus, cross-reference table 165 represents a joining condition based on fan identifiers. Based on cross-reference table 165 raw data from replicated data 120 is linked with fan golden records 145 and dynamically unified into standard views 132 and custom views 134. Since, the number of data sources and fan golden records 145 are joined, analytical queries that request information from the number of data sources may be responded to. However, customer records fields in replicated data 120 and standard views and custom views may be represented in a format that is illegible for end users to query. For example, customer records fields may be combinations of numbers and characters that do not convey ordinary meaning of what is being represented.

In one embodiment, queryable attributes are generated. The queryable attributes are exposed to client system 105 and to rest services 185, respectively, for querying replicated data 120 and fan golden records 145. In one embodiment, semantic mapping metadata 160 maps each queryable attribute to a corresponding customer record field. For example, semantic mapping metadata 160 represents mapping of queryable attributes to customer records fields from replicated data 120 and customer records fields from standard views 132 and custom views 134. For example, a 'ticket amount' queryable attribute may be generated. The 'ticket amount' queryable attribute may be mapped to a field 'amt' of a customer record in supported source data 122 and to a corresponding field 'AMT_1' of a customer record in a view from standard views 132. The queryable attributes may be legible for end users and may convey semantic meaning of corresponding fields in customer records from replicated data 120 and standard views 132 and custom views 134.

In one embodiment, analytical and other requests for information that include one or more queryable attributes may be executed over fan golden records 145 that are dynamically integrated at runtime with customer data from replicated data 120. In one embodiment, a request from client system 105 to consume services 185 may be received at engine 180 that execute services 185 within in-memory database 190. The request for information may be analytical query to determine fan related data from fan identity platform 110. An exemplary information requested mat be a list of fans who like music, have annual income higher than $100 000, and who has bought tickets for concerts in the last 3 years. "Like" information may be available Facebook data, annual income may be available in Acxiom Corporation® or other credit data reporting systems, ticket information may be available front Ticketmaster® Entertainment, Inc., etc. In one embodiment, services 185 may be SAP HANA Extended Application services and engine 180 may be SAP HANA Extended Application Engine. Upon receiving the request for information at services 185, rule execution engine 170 is activated by services 185 to retrieve fan engagement data 140 at least from fan golden records 145 and one or more in-memory database views such as custom views 134 and standard views 132. Rule execution engine 170 represents data-oriented application logic that dynamically integrates data front in-memory database views based on semantic mapping metadata 160 and cross-reference table 165. Rule execution engine 170 resolves semantic mapping of the queryable attributes, included in the request for information, to fields from customer records stored in custom views 134 and standard views 132. Rule execution engine 170 resolves semantic mapping of the queryable attributes based on semantic mapping metadata 160. Once the semantic mapping is resolved, at least one query that includes the corresponding fields from the customer records is generated. When the at least one query is executed, at runtime, rule execution engine 170 dynamically integrates fan golden records 145 with custom views 134 and standard views 132 based on cross-reference table 165 to retrieve customer and fan engagement data from replicated data 120 and fan engagement data 140, respectively. Thus, in one embodiment, on the fly transformation of replicated data 120 is implemented that entails performing the transformation, while an end user queries the data in the target system, e.g., in the fan identity platform 110.

Figure 2:
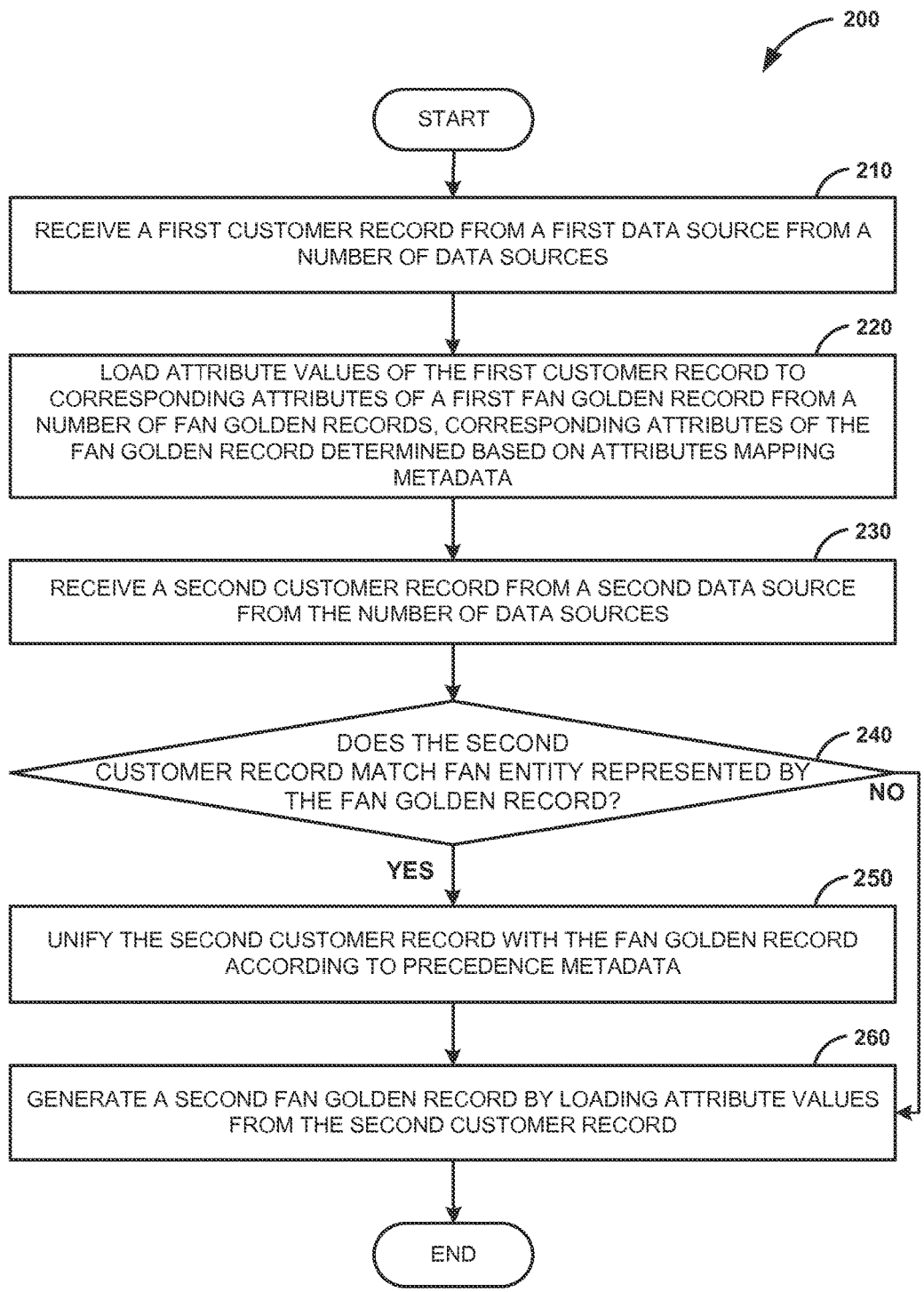
FIG. 2 illustrates a process to unify matching customer data records into fan golden records, according to one embodiment.

FIG. 2 illustrates process 200 to unify matching customer data records into fan golden records, according to one embodiment. At 210, a first customer record from a fist data source from a number of data sources is received. For example, fan identity unification engine 155 may retrieve a first customer record from a first view from standard views 132 (in FIG. 1). At 220, attribute values of the first customer record may be loaded to corresponding attributes of a first fan golden record from a number of fan golden records. The corresponding attributes of the fan golden record are determined based on attributes mapping metadata, for example, stored in fan identity unification metadata 150 in FIG. 1.

At 230, a second customer record from a second data source from the number of data sources is received. For example, fan identity unification engine 155 may retrieve a second customer record from a second view from standard views 132 (in FIG. 1). At 240, a check is performed to determine whether the second customer record matches a fan entity or identity represented by the first fan golden record. Unification rules may specify a number of matching conditions for unifying customer records into fan records. Determination whether the second customer record matches the first fan golden record is performed based the unification rules. In one embodiment, absolute matching conditions may be defined. An example of such absolute matching conditions may be when a set of attributes have same values in different customer records, then the different customer records may be matching. For example, when a fist name and an email address attribute values match in different customer records, then the different customer records may represent the same fan identity and, thus, the different records may be unified into one fan record. Table 1 illustrates exemplary absolute matching conditions.

TABLE 1

| Attributes | | | | Merge Confidence |
|---|---|---|---|---|
| First Name | Email ID | | | 100% |
| First Name | Last Name | Phone # | | 100% |
| First Name | Last Name | Address 1 | City | 100% |
| External Identifier | | | | 100% |

In one embodiment, a matching condition based on an external identifier may be defined (see Table 1). For example, when an identifier in different customer records from different, but related systems match, then the different customer records may be matching. For example, CRM and Enterprise Resource Planning (ERP) may be related systems and, thus, may share one or more external identifiers or keys. When a key of a customer record in one system match with an external key in another customer record from another, then the different customer records may represent the same fan identity and, thus, the different records may be unified into one fan record.

In one embodiment, fuzzy matching conditions may be defined that are based on fuzzy relationships between customer entities. Fuzzy matching conditions may employ both customer master data and transactional data to predict or otherwise determine customers' identity. For example, a first customer may have purchased two tickets for a sport event. On the sport event, a second customer may have purchased food, however, the second customer have not purchased a ticket. Both customers may be friends on Facebook Inc. Based on fuzzy matching logic, the identities of the customers may be matched and resolved in the different systems. Table 2 illustrates exemplary fuzzy matching conditions.

TABLE 2

| | Attributes | | | | Merge Confidence |
|---|---|---|---|---|---|
| 1 | First Name | Last Name | Zip Code | Check Acxiom, Match = 1 (100%), = 2 (50%), = 3 (33%) | 100%/ 50%/33% |
| 2 | First Name | Last Name | Phone # | | 100% |
| 3 | First Name | Last Name | Address 1 | City | 100% |
| 4 | First Name | Map Friends (Friend Data, transaction data) | | | 100% |

For example, first rule specifies that when values of attributes fist name, last name, and zip code match in different customer records, then Acxiom system may be searched for a number of identities having the same values for the attributes first name, last name, and zip code. By performing additional search in Acxiom Corporation®, customer identities may be confirmed. For example, if a single identity in Acxiom Corporation® is determined to have the specified values, indeed the different customer records may represent the same customer identity, e.g., there is 100% probability that the different customer records are the same. Alternatively, if there are two identities in Acxiom Corporation® that are determined to have the specified values, there may be a 50% probability that the different records are matching.

In one embodiment, matching conditions may also be defined based on machine learning logic. An example of such matching condition may be that when a set of attributes' values of different customer records match, then in 90% of the times the different customer records may represent the same fan identity and, thus, the different records may be unified into one fan record.

When the second customer record matches a fan entity or identity represented by the first fan golden record, at 250, the second customer record is unified with the first golden record according to precedence metadata. For example, if values of one or more attributes of the second customer record are specified to have higher precedence than values of corresponding one or more attributes stored in the first fan golden record, then the first fan golden record is updated to store corresponding attribute values of the second customer record. The corresponding one Of more attributes stored in the first golden records may be determined based on attributes mapping metadata specified in fan identity unification metadata 150 in FIG. 1. The precedence metadata according to which a data source of better quality is determined may be specified in fan identity unification metadata 150 in FIG. 1.

When the second customer record does not match the fan entity or identity represented by the first fan golden record, at 260, a second fan golden record is generated. The second fan golden record is generated by loading attribute value from the second customer record to corresponding attribute values of the second fan golden record. The corresponding attribute values of the second fan golden record may be determined based on attributes mapping metadata specified in fan identity unification metadata 150 in FIG. 1.

Figure 3:
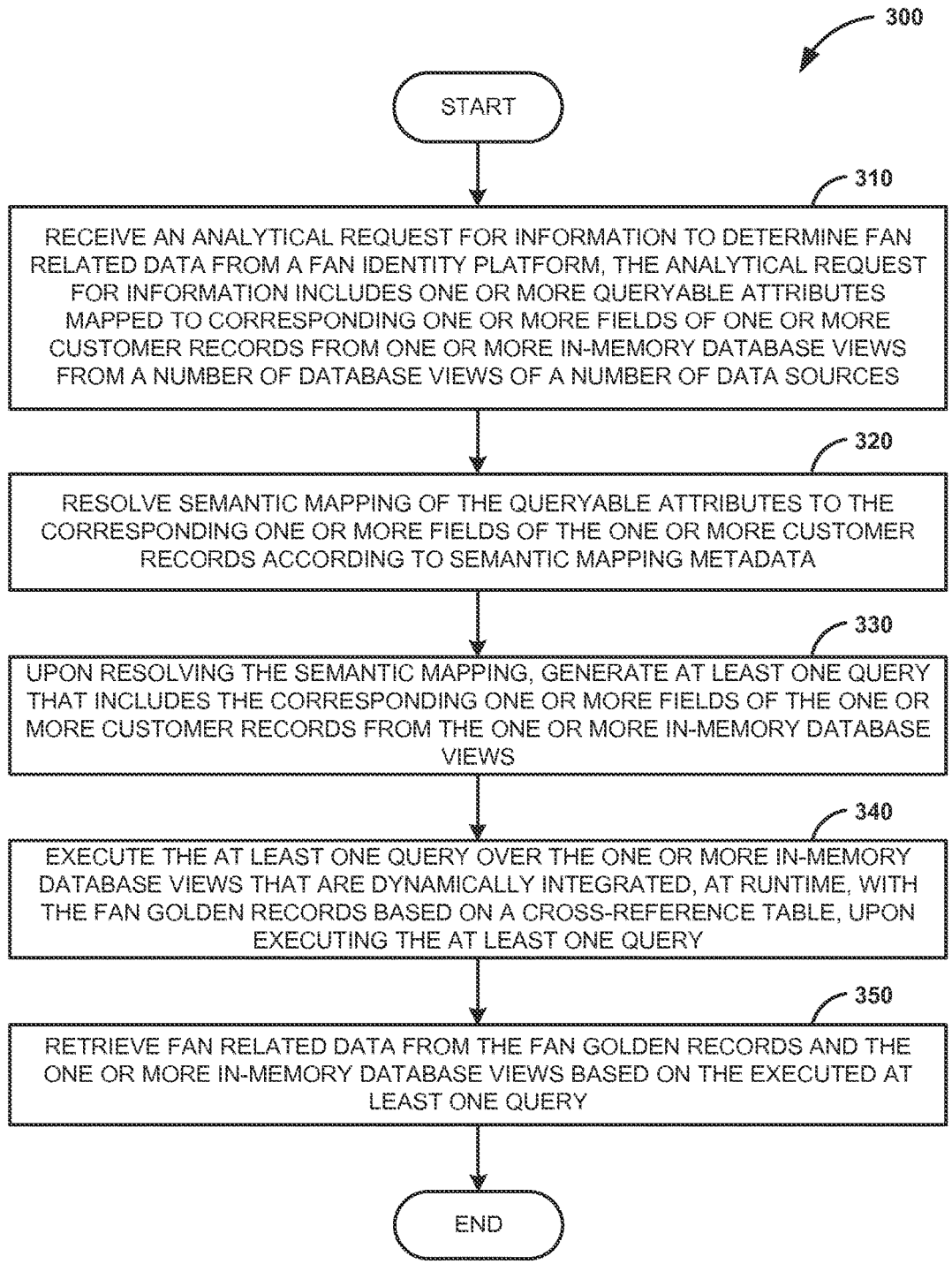
FIG. 3 illustrates a process to retrieve fan related data from fan golden records and one or more in-memory database views dynamically integrated at runtime with the fan golden records, according to one embodiment.

In one embodiment, analytical and other requests for information may be executed Over fan golden records dynamically integrated at runtime with customer data from different data sources. FIG. 3 illustrates process 300 to retrieve fan related data from fan golden records and one or more in-memory database views dynamically integrated at runtime with the fan golden records, according to one embodiment. At 310, an analytical request for information to determine fan related data from a fan identity platform is received. For example, client system 105 may request to consume services 185 that retrieve data from fan identity platform 110. The analytical request for information includes one of more queryable attributes. The one or more queryable attributes are mapped to corresponding one or more fields of one or more customer records from one or more in-memory database views of a number of data sources such as standard views 132 and custom views 134 of replicated data 120 in FIG. 1.

At 320, semantic mapping of the queryable attributes to the corresponding one or more fields of the one or more customer records is resolved, according to semantic mapping metadata such as semantic mapping metadata 160 in FIG. 1. Upon resolving the semantic mapping, at 330, at least one query that includes the corresponding one or more fields of the one or more customer records from the one Of more in-memory database views is generated. At 340, execute the at least one query over the one or more in-memory database views that are dynamically integrated at runtime with the fan golden records based on cross-reference table such as cross-reference table 1645 in FIG. 1. The in-memory database views are dynamically integrated with the fan golden records at runtime upon executing the at least one query. At 350, fan related data from the fan golden records and the one or more in-memory database views is retrieved based on the executed at least one query.

Figure 4:
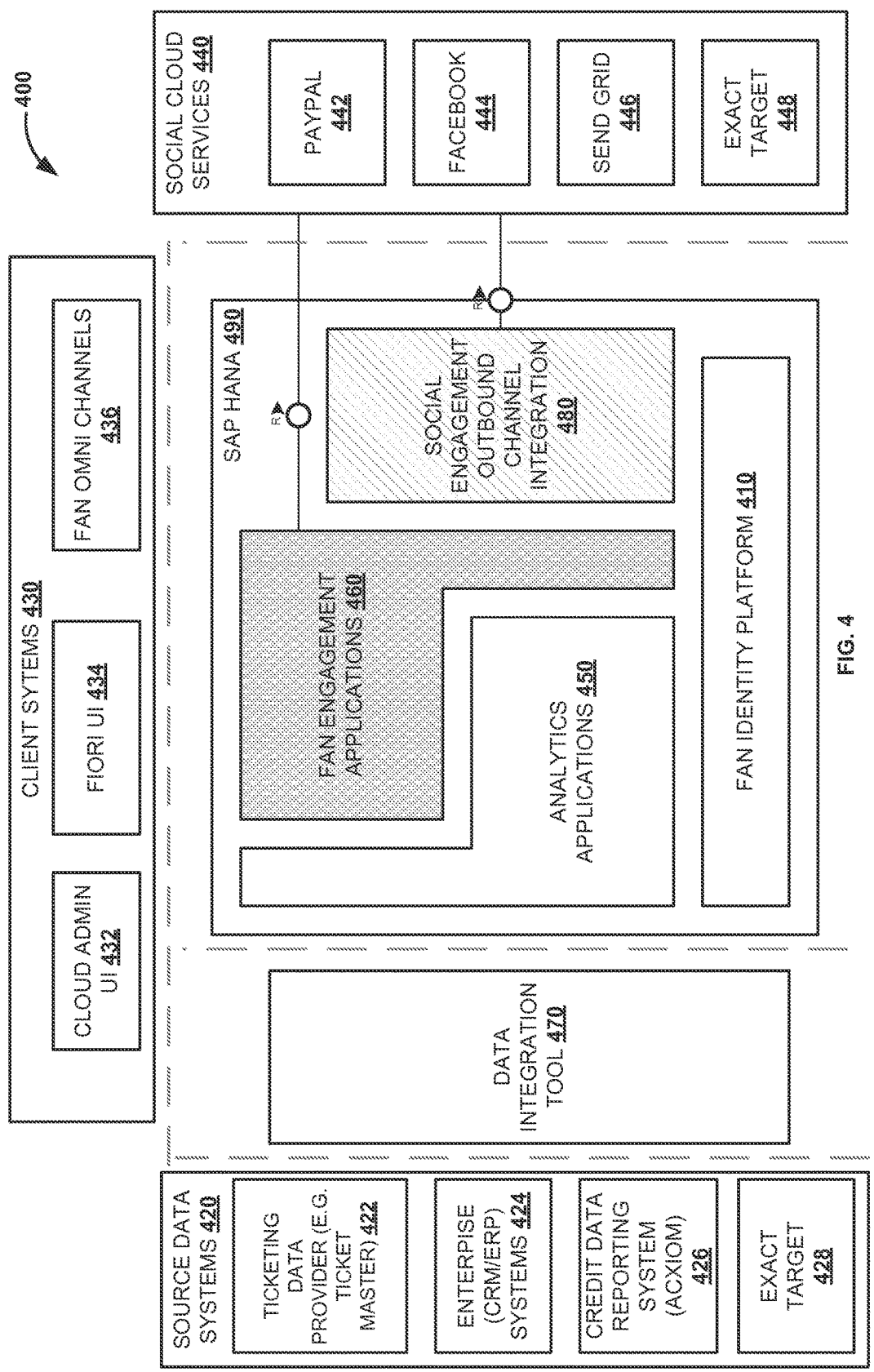
FIG. 4 illustrates computer architecture that includes exemplary applications to query fan identity platform, according to one embodiment.

FIG. 4 illustrates computer architecture 400 that includes exemplary applications to query fan identity platform 410, according to one embodiment. Customer data from source data systems 420 is replicated without transformation by data integration tool 470 to fan identity platform 410. Exemplary source data systems include, but are not limited to, ticketing data provider 422 such as Ticketmaster® Entertainment, Inc., enterprise systems 424 such as CRM and ERP, credit data reporting system 426 such as Acxiom Corporation®, ExactTarget 428 (currently referred to as Salesforce® Marketing Cloud) and others. Analytics applications 450 and fan engagement applications 460 query and retrieve data from fan identity platform 410 to determine fan related data. Analytics applications 450, fan engagement applications 460 and fan identity platform 410 are running in in-memory database such as SAP® HANA 490. In one embodiment, client systems 430 consume services and functionality provided by analytics applications 450 and fan engagement applications 460. Exemplary client systems 430 include, but are not limited to, cloud administration user interface (UI) 432, enterprise client system such as SAP® Fiori UI 434, and other channels for communication such as fan omni channels 436. Once fan related data is determined by querying fan identity platform 410, it is used to engage users of social cloud services 440 by social engagement outbound channel integration 480. Exemplary social cloud services 440 may include, but are not limited to, PayPal 442, Facebook 444, SendGrid 446, ExactTarget 448.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as Compact Discs Read-Only Memory (CD-ROMs), Digital Video Discs (DVDs) and holographic devices; magneto-optical media; and hardware devices that are specially configured to store and execute, such as application-specific integrated circuits ("ASICs"), programmable logic devices ("PLDs") and Read-only memory (ROM and Random-access memory (RAM) devices, memory cards used for portable devices such as Secure Digital (SD) cards.

Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
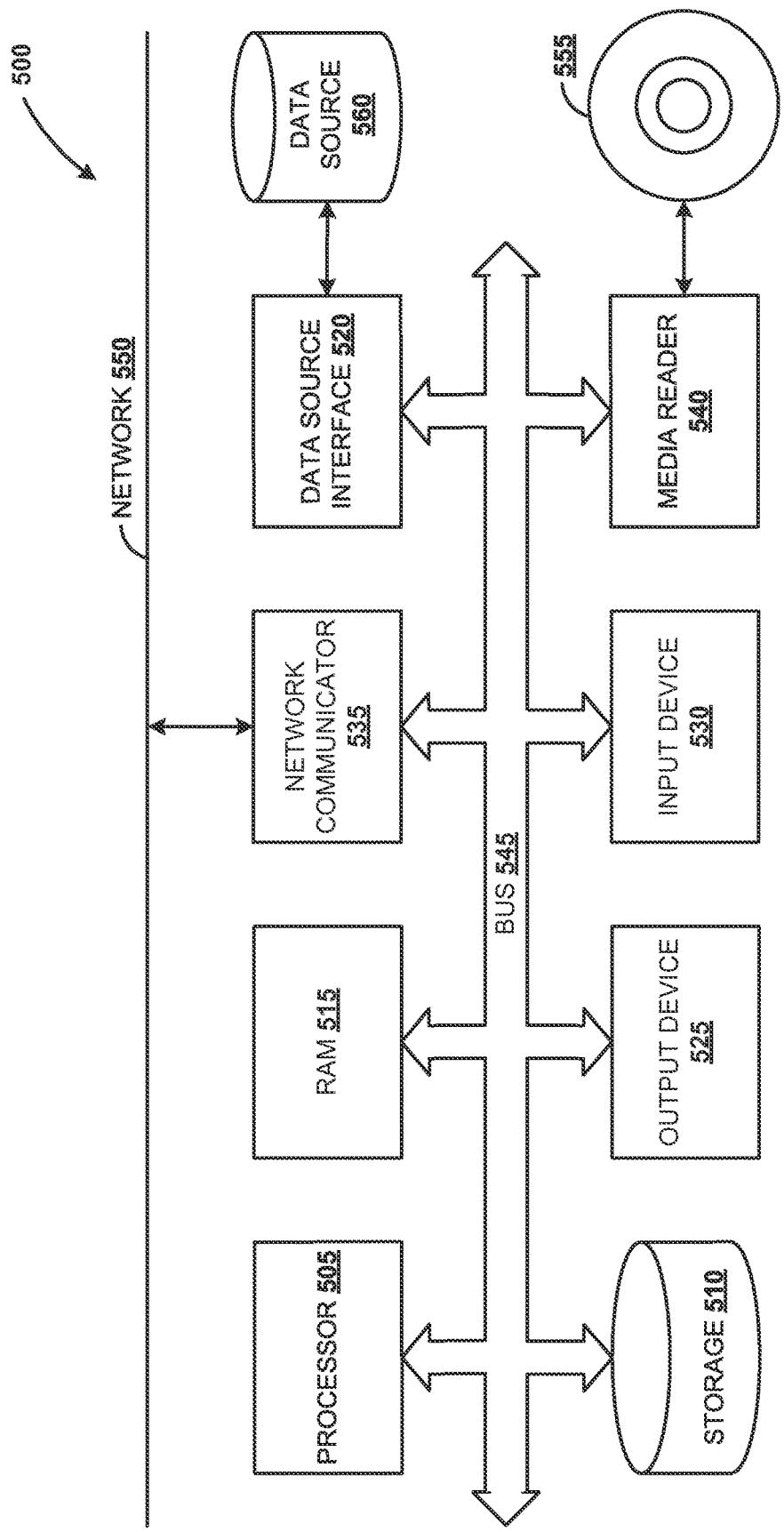
FIG. 5 illustrates an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. These output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to retrieve fan related data from a fan identity platform, the method comprising:
    receiving an analytical request for information that includes one or more queryable attributes mapped to corresponding one or more fields of one or more customer records from one or more in-memory database views from a plurality of database views of a plurality of data sources;
    resolving a semantic mapping of the queryable attributes to the corresponding one or more fields of the one or more customer records according to semantic mapping metadata;
    upon resolving the semantic mapping, generating at least one query at includes the corresponding one or more fields of the one or more customer records;
    a processor executing the at lean(one query over the one or more in-memory database views and a plurality of fan records each associated with an unique fan entity; and
    retrieving fan related data from the plurality of fan records and the one or more in-memory database views based on the executed at least one query.

2. The method of claim 1 further comprising:
    at runtime, dynamically integrating the one or more in-memory database views with the plurality fan records based on a cross-reference table linking the one or more in-memory database views with the plurality of fan records based on a fan identifier.

3. The method of claim 1 further comprising generating the plurality of fan records by:
    receiving a first customer record from a first data source from the plurality of data sources;
    receiving a second customer record from a second data source from the plurality of data sources;

determining whether the first customer record matches the second customer record based on a plurality of unification rules; and upon determining that first customer record matches the second customer record, unifying the first customer record and the second customer record into a first fan record from the plurality of fan records according to precedence metadata, wherein the precedence metadata specifies level of accuracy of the first data source compared to second data source.

4. The method of claim 3, wherein unifying the first customer record and the second customer record into the first fan record according to precedence metadata further comprises:

loading attribute values of the first customer record or the second customer record to corresponding attributes of the first fan record, wherein corresponding attributes of the first fan record are determined based on attributes mapping metadata.

5. The method of claim 3 further comprising:

upon determining that first customer record and the second customer record are not matching, generate a second fan record from a plurality of fan golden records by loading attribute values of the second customer record to corresponding attributes of the second fan record, wherein corresponding attributes of the second fan record are determined based on attributes mapping metadata.

6. The method of claim wherein determining whether the first customer record matches the second customer record based on the plurality of unification rules further comprises:

when a set of attributes in the first customer record shares values with a corresponding set of attributes in the second customer record, determining that the first customer record and the second customer record are matching.

7. The method of claim 3, wherein determining whether the first customer record matches the second customer record based on the plurality of unification rules further comprises:

when the first data source and the second data source are related systems and when the first customer record and the second customer record have same identifier, determining that the first customer record matches the second customer record.

8. The method of claim 3, wherein determining whether the first customer record matches the second customer record based on the plurality of unification rules further comprises:

resolving fan entity represented by the first customer record and the second customer record based on fuzzy relationships discovered in the plurality of data sources.

9. A computer system to retrieve fan related data from a fan identity platform, the system comprising:

a memory to store computer executable instructions;

at least one computer processor coupled to the memory to execute the instructions, to perform operations comprising:

receiving an analytical request for information that includes one or more queryable attributes mapped to corresponding one or more fields of one or more customer records from one or more in-memory database views from a plurality of database views of a plurality of data sources;

resolving a semantic mapping of the queryable attributes to the corresponding one or more fields of the one or more customer records according to semantic flapping metadata;

upon resolving the semantic mapping, generating at least one query that includes the corresponding one or more fields of the one or more customer records;

a processor executing the at least one query over the one or more in-memory database views and a plurality of fan records each associated with an unique fan entity; and retrieve fan related data from the plurality of fan records and the one or more in-memory database views based on the executed at least one query.

10. The system of claim 9, wherein the operations further comprise:

at runtime dynamically integrating the one or more in-memory database views with the plurality fan records based on a cross-reference table linking the one or more in-memory database views with the plurality of fan records based on a fan identifier.

11. The system of claim 9, wherein the operations further comprise:

receiving a first customer record from a first data source from a plurality of data sources;

receiving a second customer record from a second data source from the plurality of data sources;

determining whether the first customer record matches the second customer record based on a plurality of unification rules; and upon determining that first customer record matches the second customer record, a processor unifying the first customer record and the second customer record into a first fan record from the plurality of fan records according to precedence metadata, wherein the precedence metadata specifies level of accuracy of the first data source compared to second data source.

12. The system of claim 11, wherein unifying the first customer record and the second customer record into the first fan record according to precedence metadata further comprises:

loading attribute values of the first customer record or the second customer record to corresponding attributes of the first fan record, wherein corresponding attributes of the first fan record are determined based on attributes mapping metadata.

13. The system of claim 11, wherein the operations further comprise:

upon determining that first customer record and the second customer record are not matching, generate a second fan record from a plurality of fan golden records by loading attribute values of the second customer record to corresponding attributes of the second fan record, wherein corresponding attributes of the second fan record are determined based on attributes mapping metadata.

14. The system of claim 11, wherein determining whether the first customer record matches the second customer record based on the plurality of unification rules further comprises:

when a set of attributes in the first customer record shares values with a corresponding set of attributes in the second customer record, determining that the first customer record and the second customer record are matching.

15. A non-transitory computer readable medium storing instructions thereon, which when executed by a processor cause a computer system to:
   receive an analytical request for information that includes one or more queryable attributes mapped to corresponding one or more fields of one or more customer records from one or more in-memory database views from a plurality of database views of a plurality of data sources;
   resolve a semantic mapping of the queryable attributes to the corresponding one or more fields of the one or more customer records according to semantic mapping metadata;
   upon resolving the semantic mapping, generate at least one query that includes the corresponding one or more fields of the one or more customer records;
   execute the at least one query over the one or more in-memory database views and a plurality of fan of records each associated with an unique fan entity; and
   retrieve fan related data from the plurality of fan records and the one or more in-memory database views based on the executed at least one query.

16. The computer readable medium of claim 15, wherein the instructions when executed by the processor cause the computer system further to:
   at runtime dynamically integrate the one or more in-memory database views with the plurality fan records based on a cross-reference table linking the one or more in-memory database views with the plurality of fan records based on a fan identifier.

17. The computer readable medium of claim 15, wherein the instructions when executed by the processor cause the computer system further to further generate the plurality of fan records by:
   receiving a first customer record from a first data source from the plurality of data sources;
   receiving a second customer record from a second data source from the plurality of data sources;
   determining whether the first customer record matches the second customer record based on a plurality of unification rules; and
   upon determining that first customer record matches the second customer record, unifying the first customer record and the second customer record into a first fan record from the plurality of fan records according to precedence metadata, wherein the precedence metadata specifies level of accuracy of the first data source compared to second data source.

18. The computer readable medium of claim 17, wherein unifying the first customer record and the second customer record into the first fan record according to precedence metadata further comprises:
   loading attribute values of the first customer record or the second customer record to corresponding attributes of the first fan record, wherein corresponding attributes of the first fan record are determined based on attributes mapping metadata.

19. The computer readable medium of claim 17, wherein the instructions when executed by the processor cause the computer system further to:
   upon determining that first customer record and the second customer record are not matching, generate a second fan record from a plurality of fan golden records by loading attribute values of the second customer record to corresponding attributes of the second fan record, wherein corresponding attributes of the second fan record are determined based on attributes mapping metadata.

20. The computer readable medium of claim 17, wherein determining whether the first customer record matches the second customer record based on the plurality of unification rules further comprises:
   when a set of attributes in the first customer record shares values with a corresponding set of attributes in the second customer record, determining that the first customer record and the second customer record are matching.

\* \* \* \* \*